June 2, 1936. G. R. FORD, JR 2,042,521
METHOD AND APPARATUS FOR CASE HARDENING GLASS SHEETS
Filed April 6, 1935 2 Sheets-Sheet 1
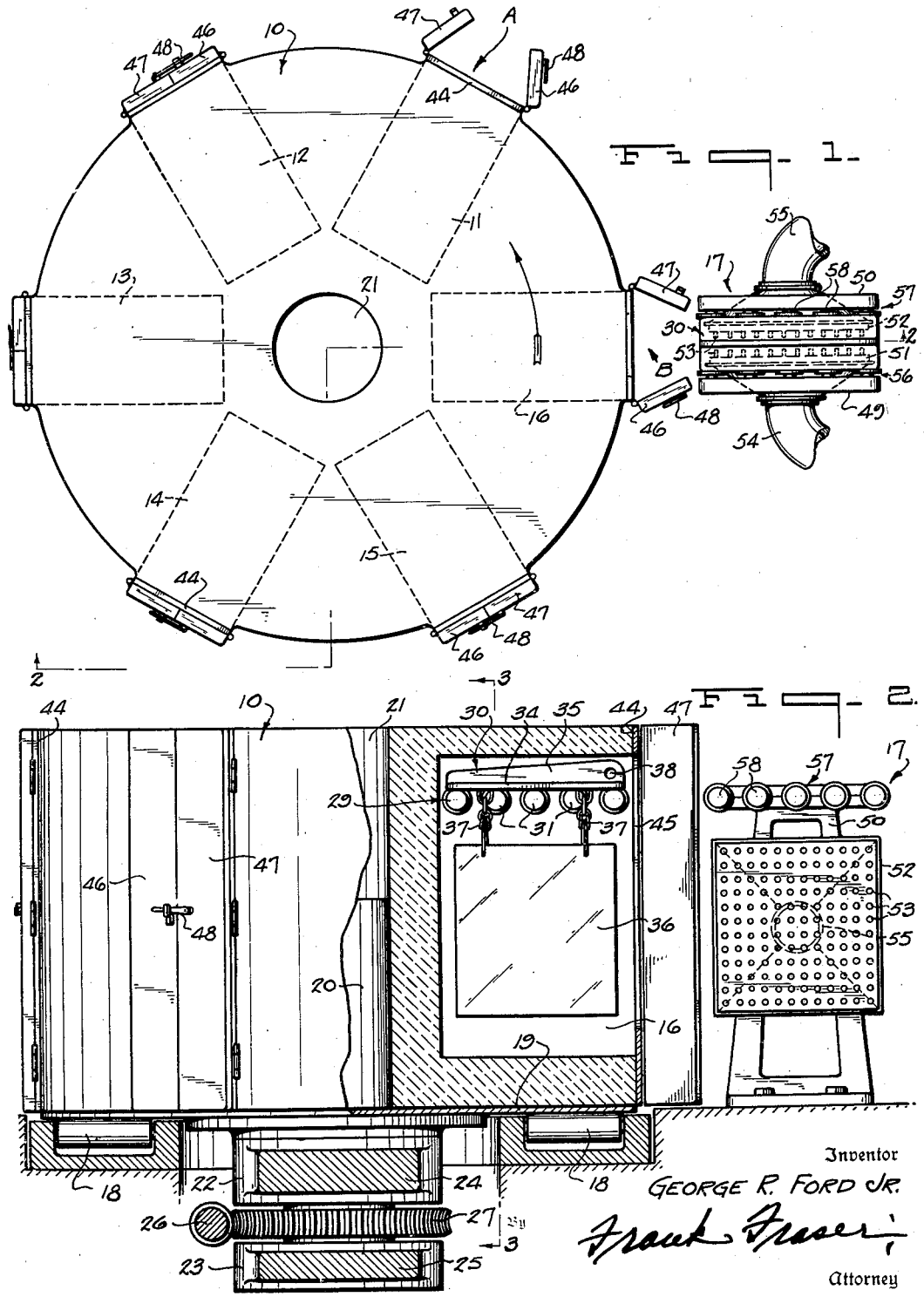

June 2, 1936.  G. R. FORD, JR  2,042,521

METHOD AND APPARATUS FOR CASE HARDENING GLASS SHEETS

Filed April 6, 1935  2 Sheets-Sheet 2

Inventor
GEORGE R. FORD JR.

By Frank Fraser
Attorney

UNITED STATES PATENT OFFICE 2,042,521

METHOD AND APPARATUS FOR CASE HARDENING GLASS SHEETS

George R. Ford, Jr., Toledo, Ohio, assignor to Libbey-Owens-Ford Glass Company, Toledo, Ohio, a corporation of Ohio Application April 6, 1935, Serial No. 14,974

20 Claims. (Cl. 49—45)

The present invention relates to the case hardening of glass and more particularly to an improved method and apparatus for hardening or tempering glass sheets or plates in a semi-continuous manner.

Generally speaking, such hardening consists in first heating a sheet of glass to approximately its point of softening and in then rapidly chilling the same to place the outer surfaces of the sheet under compression and the interior thereof under tension. Glass sheets hardened in this manner have utility as a form of safety glass since the treatment thereof not only materially increases the mechanical strength of the glass but also changes the breaking characteristics of the sheet, in that when broken it will disintegrate into innumerable small and relatively harmless fragments instead of breaking into large, dangerous pieces or splinters as in the case of ordinary glass sheets.

In accordance with the present invention, there is provided an apparatus for case hardening glass sheets including a furnace having a plurality of individual heating compartments which are adapted to be successively charged with glass sheets to be treated. A cooling means is associated with the furnace in such a manner that intermittent relative movement therebetween will effect successive alignment of the heating compartments with the cooling means as the glass sheet within each succeeding compartment reaches the desired temperature. The heated sheet is then transferred from the furnace to the cooling means where it is rapidly chilled, the compartment thus emptied being adapted to be recharged with an untreated sheet upon subsequent alignment of the next succeeding compartment with the cooling means.

With this arrangement and method of operation, it is possible to satisfactorily case harden glass sheets on a commercial scale in a semi-continuous manner without sacrificing the extreme care and accurate control that is necessary to produce hardened glass having predetermined breaking characteristics.

Other objects and advantages of this invention will become more apparent during the course of the following description when taken in connection with the accompanying drawings.

Figure 3:
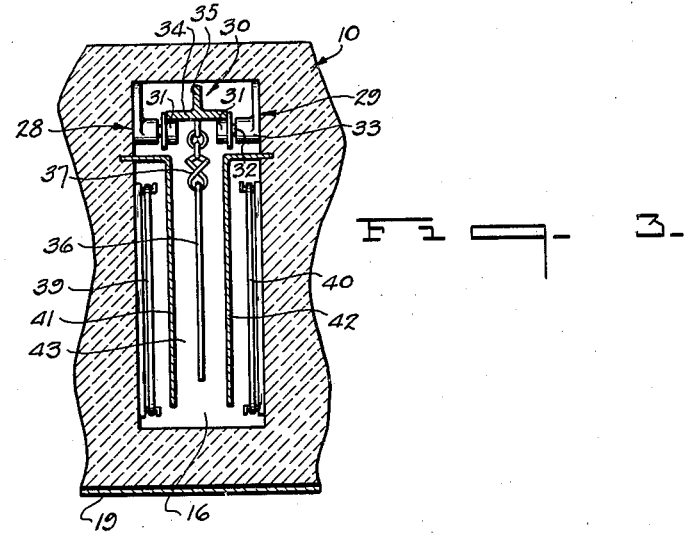
Figure 4:
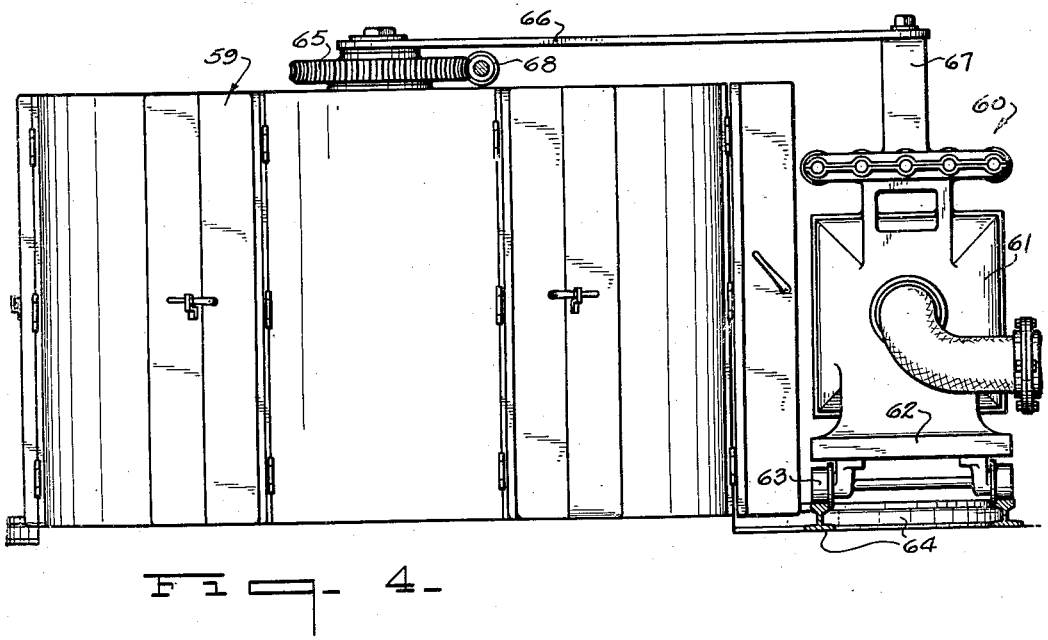

In the drawings wherein like numerals are employed to designate like parts throughout the same, Fig. 1 is a plan view of an apparatus constructed in accordance with the present invention, Fig. 2 is a longitudinal vertical section taken substantially on line 2—2 in Fig. 1, Fig. 3 is a transverse vertical section through one of the individual heating compartments taken substantially on line 3—3 in Fig. 2, and Fig. 4 is a side elevation of a somewhat modified form of apparatus.

Referring now to Figs. 1 to 3 of the drawings, the numeral 10 designates a rotatable furnace of substantially cylindrical formation, provided with a plurality of radially extending, equally spaced heating compartments 11 to 16 inclusive for receiving glass sheets to be treated. Upon rotation of the furnace, the several heating compartments are adapted to be successively aligned, at predetermined intervals, with a stationary cooling apparatus 17 mounted at the side of said furnace closely adjacent thereto. The furnace is supported for rotary movement upon a plurality of circumferentially arranged horizontal supporting rollers 18 which are engaged by a metallic base plate 19 fixed to the bottom surface of the furnace. The furnace is mounted upon a vertical shaft or spindle 20 received within a central opening 21 and journaled in the bearings 22 and 23 carried by suitable brackets 24 and 25 respectively. Intermittent rotation of the furnace 10 is preferably effected by means of a worm 26 meshing with a worm wheel 27 which is keyed to the vertical shaft 20 between the bearings 22 and 23.

As best shown in Figs. 2 and 3, each of the individual heating compartments 11 to 16 has arranged therein, adjacent the top thereof, a pair of oppositely disposed roller runways 28 and 29 for receiving and supporting an overhead carriage 30. Each of these runways comprises a series of horizontally aligned flanged rolls 31, mounted at the ends of stub shafts 32 which are journaled in bearings 33 secured to the adjacent side wall of the compartment. The carriage 30 is of substantially inverted T shape in cross section; being provided with a flat rectangular base portion 34 supported upon the rolls 31 and an upwardly extending central rib 35.

Glass sheets 36 to be heated may be suspended within the heating compartment from the base portion 34 of the carriage 30 by means of tongs or the like 37. The base portion 34 of the carriage is adapted to be supported upon and to ride freely over the rolls 31 of the opposing runways 28 and 29 which are sufficiently spaced from one another to permit the tongs 37 to hang therebetween without interference. The central rib 35 of the carriage is preferably formed with an opening 38 adjacent its forward end for receiving a hook or other implement with which to move the carriage and the glass sheet suspended therefrom into and out of the furnace. Although only a single large sheet 36 has been shown in the compartment 16 in Fig. 2, it will be understood that a suitable rack, adapted to carry a number of smaller sheets, may be suspended from the carriage 30 if desired.

In order to heat the glass sheets to approximately their point of softening while in the furnace, electrical heating means comprising series of resistance units 39 and 40 respectively are mounted along the opposite side walls of each of the compartments 11 to 16. A pair of baffle plates 41 and 42, practically enclosing the heating units 39 and 40, are positioned below the runways 28 and 29, being spaced from each other in a manner to form a relatively narrow chamber or passage 43 therebetween within which the sheet 36 is adapted to be positioned during heating. With this arrangement each of the compartments 11 to 16 is in effect an individual heating furnace, and by the use of suitable regulating means the temperature of any one of the compartments can be controlled independently of the others. Electrical heating means of the muffled type has been found most desirable for this purpose because of the great importance of obtaining a uniform and accurately controlled heating of the glass sheets. It will be understood however that any suitable type of heat may be used and that all of the compartments may be heated by a common heating means if desired.

To minimize the escape of heat during charging and discharging of the furnace, the opening to each of the heating compartments 11 to 16 is preferably covered by a face plate 44 secured to the side wall of the furnace 10 and provided with an opening 45 of sufficient size to permit the free passage therethrough of the glass sheets together with their carrying and supporting means. The compartments are adapted to be closed during heating by doors 46 and 47 hinged to the face plate 44 and provided with suitable latching or locking means 48.

As brought out above, a plurality of heating compartments are adapted to be successively served by a single cooling means and as illustrated in Fig. 1, the cooling means 17 will serve all of the compartments 11 to 16 of the furnace 10. Obviously, in the event that a furnace having a larger number of compartments were used or if the relative heating time of the hardening cycle were shortened, it might become necessary or desirable to use more than one cooling unit.

Although the invention is in no way limited to any particular type of cooling means, the cooling apparatus 17 illustrated in the drawings comprises a pair of fixed vertical supporting frames 49 and 50 carrying the spaced blower heads 51 and 52 respectively. The opposing faces of the blower heads are provided with a plurality of uniformly spaced nipples 53 through which compressed air, supplied to the heads through flexible conduits 54 and 55, may be discharged. Carried at the upper ends of the frames 49 and 50 are the horizontally arranged roller runways 56 and 57 respectively. These runways are similar in construction to the supporting runways 28 and 29 in each of the heating compartments 11 to 16 and each includes a plurality of horizontally arranged rolls 58 adapted to align with the rolls 31 of the runways 28 and 29 upon proper rotary movement of the furnace 10 to move successive compartments into alignment with the cooling apparatus 17.

When the furnace 10 is moved into discharging position, the doors 46 and 47 of the heating compartment opposite the cooling apparatus 17 are opened to permit the operator to engage the opening 38 in the central rib 35 of the carriage 30 with a suitable implement and to pull the carriage from the runways 28 and 29 onto the runways 56 and 57. With the carriage 30 in the latter position, the glass sheet 36 will be suspended directly between the blower heads 51 and 52 and may be rapidly chilled by blasts or jets of air directed onto both sides of the sheet simultaneously through the nipples 53. The blower heads may be maintained stationary or caused to oscillate or otherwise move in the plane of the sheet.

In operation, intermittent rotary movement is imparted to the furnace 10 at regular intervals to cause the heating compartments 11 to 16 to be successively and repeatedly aligned with the cooling means 17. As each compartment is brought into such position, the glass sheet is removed therefrom as explained above after which the furnace is again rotated to move the compartment which has just been emptied into loading position A. When the compartment reaches loading position, a sheet of glass to be treated is introduced therein. The doors 46 and 47 of such compartment are then closed and the compartment is advanced periodically upon intermittent rotary movement of the furnace until it again arrives at the discharge position B. The timing of the furnace movements and the temperature in the compartments is so controlled that during the travel of any one compartment from the charging position A to the discharging position B, the glass sheet 36 contained therein will be heated to substantially its point of softening which, for ordinary flat glass, is in the neighborhood of 1250° F. When the doors 46 and 47 are opened as shown in Fig. 1 to permit removal of the heated sheet from the compartment in discharging position, they will form a substantially continuous passage between the heating compartment and the cooling apparatus to protect and shield the heated sheet as it passes from the former to the latter.

A plurality of glass sheets will therefore be undergoing treatment simultaneously, the sheets within the furnace being in progressively different stages of heating so that as each sheet reaches a predetermined temperature, it will be in position to be discharged from the furnace to the cooling means. As the sheet is being removed from one compartment, an untreated sheet is being introduced into the compartment just previously emptied. This design of apparatus and method of operation will result in a highly efficient operation wherein the idle or unproductive periods of the various parts will be reduced to a minimum.

For example, glass sheets one-quarter inch in thickness have been satisfactorily hardened in a cycle of approximately six minutes, comprising a five minute heating time and a cooling time of forty-five seconds, a period of approximately fifteen seconds being allowed for transferring the heated sheet from the furnace to the cooling means and the subsequent removal of the sheet after chilling. Such a cycle can be carried out with the apparatus illustrated in Fig. 1 by imparting intermittent rotary movement to the furnace 10 at intervals of one minute each. Thus, an untreated sheet of glass is introduced into the furnace every minute and five minutes will be required to advance the sheet from the loading position A to the discharge position B, during which time the said sheet will be brought to the desired temperature. Successive compartments are brought into alignment with the cooling means upon each movement of the furnace, at one minute intervals, and since the actual cooling time is 45 seconds, fifteen seconds will be allowed for transferring the sheet from the furnace to the cooling means and its subsequent removal therefrom. Since a single cooling apparatus is adapted to serve a plurality of heating compartments, the cooling apparatus as well as the furnace will be in substantial continuous operation, thereby reducing to a minimum loss of time of either the machine or the operator in charge thereof.

In Fig. 4 of the drawings there has been illustrated a modified form of apparatus which is similar in design and operation to that shown in Figs. 1 to 3 except that the heating furnace 59 is stationary while the cooling apparatus, designated in its entirety by the numeral 60, is adapted to revolve about the furnace. To this end, the blower units 61 are mounted upon a truck 62 provided with wheels 63 which run on a circular track 64 extending entirely around the furnace.

A worm wheel 65 is rotatably mounted directly above the center of the furnace 59 and has driving connection with the cooling apparatus 60 by means of a horizontal bar 66 and a vertical bracket 67. The cooling apparatus 60 is caused to align with successive heating compartments of the furnace by intermittent movement at regular intervals of the truck 62 along the track 64. This movement is imparted to the truck by means of a worm 68 meshing with and driving the worm wheel 65.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for case hardening glass sheets, a furnace including a plurality of heating compartments for receiving the sheets to be treated, means for heating said compartments, cooling means associated with said furnace and adapted to receive the heated glass sheets therefrom, and means for causing intermittent relative movement in one direction between the furnace and cooling means to effect successive and repeated alignment of each of the heating compartments with said cooling means.

2. In apparatus for case hardening glass sheets, a furnace including a plurality of radially extending heating compartments for receiving the sheets to be treated, means for heating said compartments, cooling means associated with said furnace and adapted to receive the heated glass sheets therefrom, and means for causing relative movement between the furnace and cooling means to effect alignment of any one of said heating compartments with said cooling means.

3. In apparatus for case hardening glass sheets, a furnace including a plurality of heating compartments for receiving the sheets to be treated, means for heating said compartments, cooling means associated with said furnace and adapted to receive the heated glass sheets therefrom, and means for causing relative rotary movement between the furnace and cooling means to effect successive alignment of the heating compartments with said cooling means.

4. In apparatus for case hardening glass sheets, a furnace including a plurality of radially extending heating compartments for receiving the sheets to be treated, means for heating said compartments, cooling means associated with said furnace and adapted to receive the heated glass sheets therefrom, and means for causing relative movement between the furnace and cooling means about a common center to place the cooling means in operative relation with successive heating compartments.

5. In apparatus for case hardening glass sheets, a furnace including a plurality of heating compartments for receiving the sheets to be treated, means for heating said compartments, cooling means associated with said furnace and adapted to receive the heated glass sheets therefrom, and means for effecting movement of the furnace relative to said cooling means to bring any one of the heating compartments into operative relation with the cooling means.

6. In apparatus for case hardening glass sheets, a furnace including a plurality of radially extending heating compartments for receiving the sheets to be treated, means for heating said compartments, cooling means associated with said furnace and adapted to receive the heated glass sheets therefrom, and means for rotating the furnace to bring any one of the heating compartments into operative relation with the cooling means.

7. In apparatus for case hardening glass sheets, a furnace including a plurality of heating compartments for receiving the sheets to be treated, means for heating said compartments, cooling means associated with said furnace and adapted to receive the heated glass sheets therefrom, and means for effecting intermittent movement of the cooling means in one direction relative to the furnace to bring said cooling means into succcessive and repeated alignment with each one of the heating compartments.

8. In apparatus for case hardening glass sheets, a furnace including a plurality of radially extending heating compartments for receiving the sheets to be treated, means for heating said compartments, cooling means assciated with said furnace and adapted to receive the heated glass sheets therefrom, and means for revolving the cooling means about the furnace to bring said cooling means into operative relation with any one of the heating compartments.

9. In apparatus for case hardening glass sheets, a furnace including a plurality of heating compartments for receiving the sheets to be treated, means for heating said compartments, cooling means associated with said furnace and adapted to receive the heated glass sheets therefrom, means for causing intermittent relative movement between the furnace and cooling means to effect successive alignment of the heating compartments with said cooling means, and sheet supporting means movable between the furnace and cooling means to position the glass sheets during treatment.

10. In apparatus for case hardening glass sheets, a furnace including a plurality of heating compartments for receiving the sheets to be treated, means for heating said compartments, cooling means associated with said furnace and adapted to receive the heated glass sheets therefrom, means for causing relative rotary movement between the furnace and cooling means to effect successive alignment of the heating compartments with said cooling means, and sheet supporting means movable horizontally between the furnace and cooling means to position the glass sheets during treatment.

11. In apparatus for case hardening glass sheets, a furnace including a plurality of radially extending heating compartments for receiving glass sheets to be treated, means for heating said compartments, cooling means associated with said furnace and adapted to receive the heated glass sheets therefrom, means for effecting intermittent movement of the furnace in one direction relative to said cooling means to bring the heating compartments into successive and repeated alignment with the cooling means, and sheet supporting means movable horizontally between the furnace and cooling means to position the glass sheets during treatment.

12. In apparatus for case hardening glass sheets, a furnace including a plurality of heating compartments for receiving the sheets to be treated, heating means for said compartments, cooling means associated with said furnace and adapted to receive the heated glass sheets therefrom, movable carriages for supporting said sheets during treatment, a runway associated with each of the heating compartments for supporting one of said carriages, a supporting runway associated with said cooling means and adapted to receive the carriages from said first mentioned runways, and means for providing relative movement between the furnace and cooling means to effect alignment of the supporting runway associated with any one of the heating compartments with the runway associated with said cooling means.

13. In apparatus for case hardening glass sheets, a furnace including a plurality of radially extending heating compartments for receiving the sheets to be treated, heating means for said compartments, cooling means associated with said furnace and adapted to receive the heated glass sheets therefrom, movable carriages for supporting said sheets during treatment, a horizontal runway arranged within each of said heating compartments for supporting one of said carriages, a horizontal supporting runway associated with said cooling means and adapted to receive the carriages from said first mentioned runways, and means for causing relative movement between the furnace and cooling means to effect alignment of the runway within any one of the heating compartments with the runway associated with said cooling means.

14. In apparatus for case hardening glass sheets, a furnace including a plurality of heating compartments for receiving the sheets to be treated, heating means for said compartments, cooling means associated with said furnace and adapted to receive the heated glass sheets therefrom, movable carriages for supporting said sheets during treatment, a runway associated with each of said heating compartments for supporting one of said carriages, a supporting runway associated with said cooling means and adapted to receive the carriages from said first mentioned runways, and means for causing movement of the furnace relative to said cooling means to effect alignment of the supporting runway associated with any one of the heating compartments with the runway associated with said cooling means.

15. In apparatus for case hardening glass sheets, a furnace including a plurality of radially extending heating compartments for receiving the sheets to be treated, heating means for said compartments, cooling means associated with said furnace and adapted to receive the heated glass sheets therefrom, movable carriages for supporting said sheets during treatment, a horizontal runway arranged within each of said heating compartments for supporting one of said carriages, a horizontal supporting runway associated with said cooling means and adapted to receive the carriages from said first mentioned runways, and means for rotating the furnace relative to the cooling means to bring the supporting runway within any one of the heating compartments into alignment with the runway associated with the cooling means.

16. In apparatus for case hardening glass sheets, a furnace including a plurality of heating compartments for receiving the sheets to be treated, heating means for said compartments, cooling means associated with said furnace and adapted to receive the heated glass sheets therefrom, movable carriages for supporting said sheets during treatment, a runway associated with each of said heating compartments for supporting one of said carriages, a supporting runway associated with said cooling means and adapted to receive the carriages from said first mentioned runways, and means for effecting movement of said cooling means relative to said furnace to bring the supporting runway associated with the cooling means into alignment with the runway associated with any one of the heating compartments.

17. In apparatus for case hardening glass sheets, a furnace including a plurality of radially extending heating compartments for receiving the sheets to be treated, heating means for said compartments, cooling means associated with said furnace and adapted to receive the heated glass sheets therefrom, movable carriages for supporting said sheets during treatment, a horizontal runway arranged within each of said heating compartments for supporting one of said carriages, a horizontal supporting runway associated with said cooling means and adapted to receive the carriages from said first mentioned runways, and means for revolving said cooling means about said furnace to bring the supporting runway associated with said cooling means into alignment with the supporting runway within any one of the heating compartments.

18. The method of case hardening glass sheets, which consists in successively charging a plurality of untreated sheets of glass into a furnace, heating each sheet independently of the others to substantially the point of softening of the glass while in said furnace, maintaining the sheets in progressively different stages of heating, successively removing the sheets from the furnace when they reach a predetermined temperature, and in rapidly chilling each sheet as it is removed from the furnace to case harden the same.

19. The method of case hardening glass sheets, which consists in successively charging a furnace with untreated sheets of glass, heating each sheet independently of the others to substantially the point of softening of the glass while in said furnace, maintaining the sheets in progressively different stages of heating, causing intermittent movement of the furnace to bring the sheets step by step to discharging position, in so regulating the heating and movement of the sheets that each sheet will be at a predetermined temperature when it reaches the point of discharge, successively removing the heated sheets from the furnace at the point of discharge, and in subjecting each sheet as it is removed from the furnace to a sudden cooling action to case harden the same.

20. The method of case hardening glass sheets, which consists in successively charging a plurality of untreated sheets of glass into a furnace, heating each sheet independently of the others to substantially the point of softening of the glass while in said furnace whereby the sheets will be in successive stages of heating, providing a common cooling means movable into alignment with any one of the glass sheets when such sheet reaches the desired temperature, and in successively transferring the heated sheets from the furnace to the cooling means and rapidly chilling the same to effect case hardening thereof.

GEORGE R. FORD, Jr.